United States Patent
Winkler et al.

(10) Patent No.: US 9,683,540 B2
(45) Date of Patent: Jun. 20, 2017

(54) ELECTRIC UNIT FOR A PUMPED-STORAGE POWER PLANT HAVING COMPONENTS WITHIN AND OUTSIDE OF AN UNDERGROUND CAVERN

(71) Applicant: ABB Technology AG, Zürich (CH)

(72) Inventors: Friedrich Winkler, Olten (CH); Georg Traxler-Samek, Hallwil (CH); Stefan Linder, Zofingen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/384,071

(22) PCT Filed: Mar. 11, 2013

(86) PCT No.: PCT/EP2013/054857
§ 371 (c)(1),
(2) Date: Sep. 9, 2014

(87) PCT Pub. No.: WO2013/132098
PCT Pub. Date: Sep. 12, 2013

(65) Prior Publication Data
US 2015/0035285 A1    Feb. 5, 2015

(30) Foreign Application Priority Data

Mar. 9, 2012 (EP) .................................. 12158786

(51) Int. Cl.
*F03B 13/06* (2006.01)
*H02M 7/483* (2007.01)
(Continued)

(52) U.S. Cl.
CPC ............. *F03B 13/06* (2013.01); *F01D 19/00* (2013.01); *H02J 3/36* (2013.01); *H02K 7/1807* (2013.01);
(Continued)

(58) Field of Classification Search
CPC ...... F01D 19/00; H02K 7/1807; H02M 7/483; H02P 1/52; H02P 25/022; H02P 27/14;
(Continued)

(56) References Cited

U.S. PATENT DOCUMENTS 1,217,165 A * 2/1917 Fessenden .................. F24J 2/07
126/572
1,247,520 A * 11/1917 Fessenden ................. F03D 9/13
290/4 D
(Continued)

FOREIGN PATENT DOCUMENTS

DE           10044262 A1 * 3/2002 ........... F03D 7/0224
DE     10 2004 005191 A1    9/2005
(Continued)

OTHER PUBLICATIONS

International Preliminary Examination Report on Patentability (Forms PCT/IB/373) and the Written Opinion of the International Searching Authority (Form PCT/ISA/37) issued on Sep. 9, 2014, by the International Bureau of WIPO in corresponding International Application No. PCT/EP2013/054857. (5 pages).
(Continued)

*Primary Examiner* — Tulsidas C Patel
*Assistant Examiner* — S. Mikailoff
(74) *Attorney, Agent, or Firm* — Taft Stettinius & Hollister LLP

(57) ABSTRACT

A pumped-storage power plant, such as an electric unit can include a frequency converter and a rotating electric synchronous machine, the machine being provided in a cavern. The frequency converter can include at least two elements which can be used as inverters or as rectifiers according to the operating mode of the machine, for example during the operation of the motor or during the operation of the generator. The machine-side element can be provided within
(Continued)

the cavern, and the network-side element can be provided outside of the cavern.

11 Claims, 2 Drawing Sheets

(51) Int. Cl.

| | |
|---|---|
| *H02J 3/36* | (2006.01) |
| *H02K 7/18* | (2006.01) |
| *F01D 19/00* | (2006.01) |
| *H02P 27/14* | (2006.01) |
| *H02H 7/04* | (2006.01) |
| *H02P 1/52* | (2006.01) |
| *H02J 3/42* | (2006.01) |
| *H02P 9/00* | (2006.01) |
| *H02P 25/022* | (2016.01) |
| *H02H 3/02* | (2006.01) |
| *H02P 9/04* | (2006.01) |
| *H02P 9/08* | (2006.01) |
| *H02P 25/024* | (2016.01) |

(52) U.S. Cl.
CPC ............ *H02M 7/483* (2013.01); *H02H 3/02* (2013.01); *H02H 7/04* (2013.01); *H02J 3/42* (2013.01); *H02P 1/52* (2013.01); *H02P 9/00* (2013.01); *H02P 9/04* (2013.01); *H02P 9/08* (2013.01); *H02P 25/022* (2013.01); *H02P 25/024* (2016.02); *H02P 27/14* (2013.01); *Y02E 60/17* (2013.01); *Y02P 80/116* (2015.11)

(58) Field of Classification Search
CPC ...... H02P 9/00; H02P 9/04; H02P 9/08; F03B 13/06
See application file for complete search history.

(56) References Cited

U.S. PATENT DOCUMENTS

| | | | | |
|---|---|---|---|---|
| 3,614,268 A * | 10/1971 | Merenda | ................ | F03B 15/06 290/52 |
| 3,939,356 A * | 2/1976 | Loane | ...................... | F02C 6/16 290/52 |
| 3,988,897 A * | 11/1976 | Strub | ...................... | F02C 6/16 417/243 |
| 4,182,128 A * | 1/1980 | Gardner | ................ | F03B 13/06 60/398 |
| 4,607,169 A * | 8/1986 | Donnelly, Jr. | ......... | F03B 13/00 165/48.1 |
| 4,786,852 A | 11/1988 | Cook | | |
| 4,952,852 A | 8/1990 | Bando et al. | | |
| 5,015,941 A | 5/1991 | Dhyanchand | | |
| 5,047,654 A * | 9/1991 | Newman | ................... | F24J 2/07 290/52 |
| 5,864,183 A | 1/1999 | Fisher, Jr. et al. | | |
| 7,281,371 B1 * | 10/2007 | Heidenreich | ........... | F03B 13/00 60/398 |
| 7,656,050 B2 * | 2/2010 | Riley | ..................... | F03B 13/06 290/43 |
| 7,952,219 B2 * | 5/2011 | Riley | ..................... | F03B 13/06 290/43 |
| 8,193,652 B2 * | 6/2012 | Paoli | ...................... | F03B 3/103 290/43 |
| 2003/0057777 A1 * | 3/2003 | Schuette | .................. | H02P 9/08 307/64 |
| 2007/0114796 A1 * | 5/2007 | Garces | ................... | F03D 9/003 290/43 |
| 2008/0136186 A1 * | 6/2008 | Gogoana | ................ | F15B 1/024 290/43 |
| 2010/0096858 A1 * | 4/2010 | Riley | ..................... | F03B 13/06 290/54 |
| 2010/0133816 A1 | 6/2010 | Abolhassani et al. | | |
| 2010/0253255 A1 * | 10/2010 | Ranganathan | ........... | H02P 4/00 318/400.09 |
| 2011/0002149 A1 | 1/2011 | Hiller et al. | | |
| 2015/0035499 A1 * | 2/2015 | Hillberg | ................. | H02P 27/14 322/8 |
| 2015/0048623 A1 * | 2/2015 | Stephan | .................. | H02P 27/14 290/40 R |

FOREIGN PATENT DOCUMENTS

| | | |
|---|---|---|
| DE | 10 2008 007659 A1 | 2/2009 |
| EP | 0 303 171 A2 | 2/1989 |
| WO | WO 2005/073550 A1 | 8/2005 |

OTHER PUBLICATIONS

International Preliminary Examination Report on Patentability (Forms PCT/IB/373) and the Written Opinion of the International Searching Authority (Form PCT/ISA/237) issued on Sep. 9, 2014, by the International Bureau of WIPO in corresponding International Application No. PCT/EP2013/054862. (13 pages).
International Preliminary Report on Patentability (Form PCT/IB/373) and the Written Opinion of the International Searching Authority (PCT/ISA/237) issued on Sep. 9, 2014, by the International Bureau of WIPO in corresponding International Application No. PCT/EP2013/054870. (6 pages).
International Preliminary Report on Patentability (Form PCT/IB/373) and the Written Opinion of the International Searching Authority (PCT/ISA/237) issued on Sep. 9, 2014, by the International Bureau of WIPO in corresponding International Application No. PCT/EP2013/054884. (11 pages).
International Search Report (PCT/ISA/210) mailed on Feb. 19, 2014, by the European Patent Office as the International Searching Authority for International Application No. PCT/EP2013/054862.
International Search Report (PCT/ISA/210) mailed on Jun. 6, 2013, by the European Patent Office as the International Searching Authority for International Application No. PCT/EP2013/054870.
International Search Report (PCT/ISA/210) mailed on Mar. 19, 2014, by the European Patent Office as the International Searching Authority for International Application No. PCT/EP2013/054884.
International Search Report (PCT/ISA/210) mailed on May 15, 2014, by the European Patent Office as the International Searching Authority for International Application No. PCT/EP2013/054857.
Korn et al., "Low Output Frequency Operation of the Modular Multi-Level Converter", Energy Conversion Congress and Exposition, Sep. 12, 2010, pp. 3993-3997.
Ng et al., "A Multilevel Modular Converter for a Large, Light Weight Wind Turbine Generator", IEEE Transactions on Power Electronics, May 1, 2008, pp. 1062-1074, vol. 23, No. 3.
Happoldt et al., "The Present State of Pumped Storage in Europe", IEEE Transactions on Power Apparatus and Systems, Oct. 1, 1963, pp. 618-631, vol. 82, No. 68.

\* cited by examiner

ELECTRIC UNIT FOR A PUMPED-STORAGE POWER PLANT HAVING COMPONENTS WITHIN AND OUTSIDE OF AN UNDERGROUND CAVERN

TECHNICAL FIELD

The invention relates to a pumped-storage power plant, in particular to an electric unit therefor, comprising a frequency converter and a rotating electric synchronous machine, wherein the machine is provided in a cavern.

PRIOR ART

Regenerative energy sources such as, for example, wind energy and solar energy provide a continuously increasing proportion of the electricity demand. These energy sources do have discontinuous operating times, however. Therefore, a direct and permanent supply of electricity to consumers from these energy sources cannot be ensured. For this, energy stores need to be used which enable rapid changes between a surplus of electricity and a deficit of electricity and whose power and energy flow direction can be changed quickly and continuously.

In this case, there are different systems available as energy stores which are in each case particularly suitable for specific quantities of energy and application cases. For low quantities of energy up to approximately 20 MWh, kinetic stores (for example flywheels), electrochemical stores (batteries, redox flow cells) or electromagnetic stores (capacitors, supercapacitors, superconducting coils) are preferably used, depending on the application. For medium quantities of energy of up to a few 100 MWh, in principle thermodynamic stores (compressed-air stores, electrothermic stores) are particularly well suited. For large quantities of energy of typically over 100 MWh and usually over 1 GWh, pumped stores are used.

Pumped stores or pumped-storage power plants are of particular interest owing to the large amount of energy that can be stored. In this case, with surplus electricity water is pumped from a first natural storage basin 12a or storage basin 12a set up artificially for this purpose into a second storage basin 12b positioned higher. In the process, the electrical energy is converted into potential energy. In order to recover electricity, water is directed from the higher storage basin 12b via a turbine back into the lower storage basin 12a. For this system, minimization of the losses in the conversion processes is particularly important.

Modern pumped stores have variable-speed drives. By decoupling the speed of the machines from a grid frequency, rotational speeds of the pumps and turbines can be set such that they are operated close to optimum efficiency. In addition, the variation in the speed during pump operation makes it possible to freely adjust the power consumption. In particular, systems with a variable speed can be connected to or synchronized with the grid quickly from a standstill.

Pumped stores in accordance with the prior art have double-fed asynchronous machines and power electronics frequency converters, whereby speed regulation of a pump and a turbine is possible. In this case, a stator of the double-fed asynchronous machine is connected directly to the electric grid with a grid frequency. A rotor of the double-fed asynchronous machine is connected to the grid via a frequency transformer and can therefore have a variable frequency. Thus, firstly a pump power is regulated and secondly the efficiency of the system can be increased, if required.

In the case of pumped stores, provision is often made for the machine equipment such as, for example, turbines, pumps, motor generators and transformers, to be accommodated in a cavern introduced into rock, in a cavity or in a closed area beneath the second storage basin, for example. Another form of pumped store provides pump, turbine and motor generator at the lower end of a shaft, wherein further power plant components are provided above ground in a building or likewise in the shaft, for example.

This way of accommodating the power plant is a consequence of the circumstance whereby the turbines need to be positioned sufficiently below the lower storage basin in order to avoid cavitation. For space and geometry reasons, this is usually only possible by virtue of a machine hall or powerhouse for accommodating the machine equipment being built underground. Furthermore, an underground design provides protection against environmental influences such as descents of avalanches, for example. Furthermore, for environmental protection or landscape protection reasons, an underground design is likewise often used.

An essential disadvantage of this arrangement with a double-fed asynchronous machine consists in that the parts of the system for generating the variable speed, for example such as field-circuit transformers, frequency converters, polarity reversal switches and starter short circuiters need to be arranged in the direct vicinity of the machine. These parts have a high space requirement, as a result of which a powerhouse for accommodating them is substantially increased in size. In particular in the case of an underground design, for example in a cavern, the erection of the powerhouse results in very high costs.

In the arrangement comprising a double-fed asynchronous machine in accordance with the prior art, a generator transformer is likewise located close to the machine. Owing to the high machine currents, it is not possible to use long connecting lines since this results in a high reactive power requirement with at the same time active power losses. Furthermore, there is the risk of oscillations between the machine and the transformer. In this case, the generator transformer likewise requires a large amount of space and needs to be built in a specially protected part of the cavern owing to the risk of explosion. Often, a secondary cavern is used for this, and this only accommodates the generator transformer. This results in a further increase in the costs involved for such a cavern.

Against this background, the present invention is based on the object of simplifying the erection and maintenance of a pumped-storage power plant and reducing the costs associated therewith.

DESCRIPTION OF THE INVENTION

This object is achieved by an electric unit for a pumped-storage power plant as claimed in claim 1. Further advantageous configurations result from the dependent claims, wherein back-references in the claims are not intended to exclude any other expedient combinations of claims.

The invention relates to an electric unit for a pumped-storage power plant, wherein said electric unit is connectable to an electric grid. The electric unit in this case comprises a closed machine hall 5, preferably a cavern 5 or rock cavern 5, a frequency converter 3 and a rotating electric synchronous machine 4, which acts as motor or generator depending on a type of operation of the machine 4. The machine 4 is mechanically connectable to a water turbine/pump apparatus 11, which can operate as either (A) a water turbine and a water pump or (B) a reversible pump turbine and is provided beneath a storage basin 12a,b in the machine hall 5. The frequency converter 3 has two elements 6, 7 which are connected electrically to one another by a DC link 9, wherein in each case one element 6, 7 is usable as a rectifier and one element 6, 7 is usable as an inverter, depending on the operation of the machine 4, and wherein the machine-side element 6 or inverter unit INU is provided within the machine hall 5 and the grid-side element 7 or active rectifier unit ARU is provided outside the machine hall 5.

In an advantageous configuration of the invention, the electric unit comprises a generator transformer, which is provided outside the machine hall.

In a further advantageous embodiment, the electric unit additionally comprises a filter, which is provided outside the machine hall.

In a further advantageous embodiment, the elements of the converter are each usable for inductive generator operation, capacitive generator operation, inductive motor operation or capacitive motor operation, or in other words the two elements of the converter can be operated in all four quadrants of a four-quadrant representation of active power and reactive power.

In a particularly advantageous embodiment, provision is made for the converter to be in the form of a self-commutated converter comprising a, for example, concentrated or distributed voltage DC link or comprising a current DC link.

In a further advantageous embodiment, the converter is in the form of an externally commutated converter.

A further embodiment provides for the electrical connection between the elements of the converter to have less than 0.2% active power losses.

Correspondingly, the invention simplifies the erection of a pumped store in particular in the case of an underground design, for example in a rock cavern. The local separation of the electric unit in this case not only saves costs when it is lifted out of the cavern, but also during maintenance, for example as a result of simplified explosion protection of the generator transformer outside the cavern.

BRIEF DESCRIPTION OF THE DRAWINGS

Further features, details and advantages of the invention result from the wording of the claims and from the description of exemplary embodiments on the basis of the FIGURE.

The invention will be explained in more detail on the basis of the following text with reference to preferred exemplary embodiments using the FIGURE, in which.

The reference symbols and the significance thereof are summarized in the list of reference symbols. In general, the same reference symbols denote the same parts.

DETAILED DESCRIPTION OF EXEMPLARY EMBODIMENTS

Figure 1:
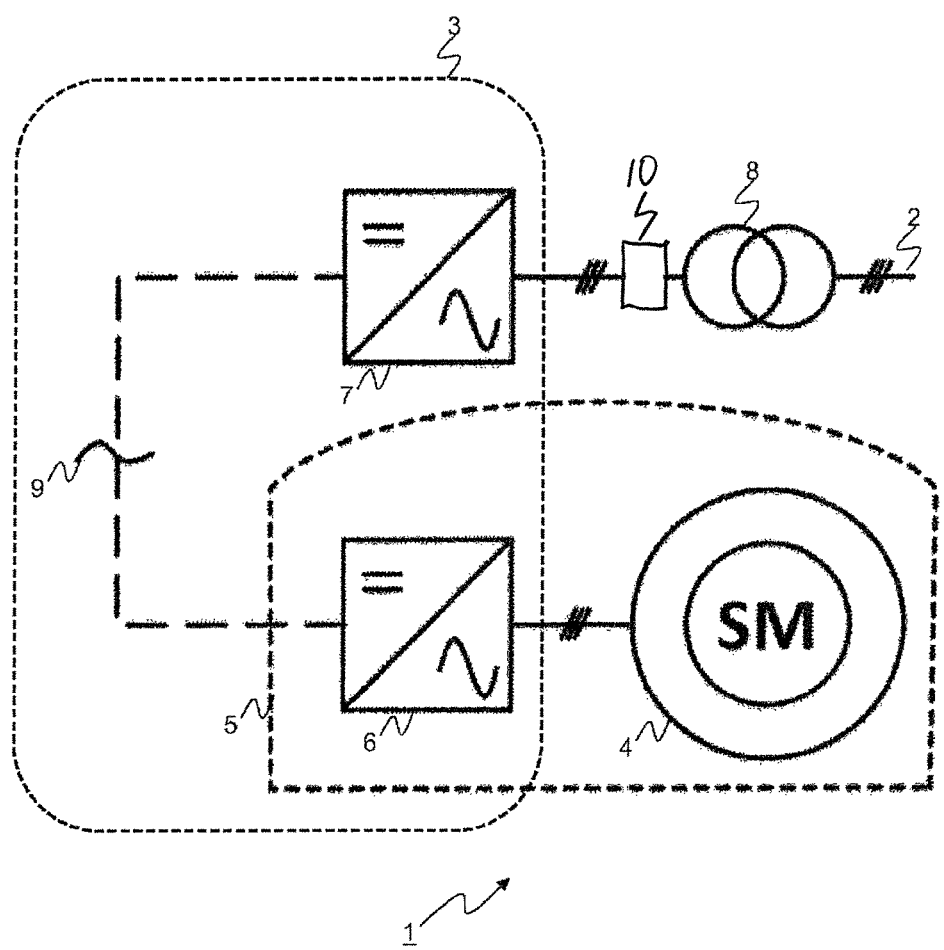
FIG. 1 shows a schematic illustration of an electric unit comprising a frequency converter, an electric synchronous machine and a generator transformer.
Figure 2:
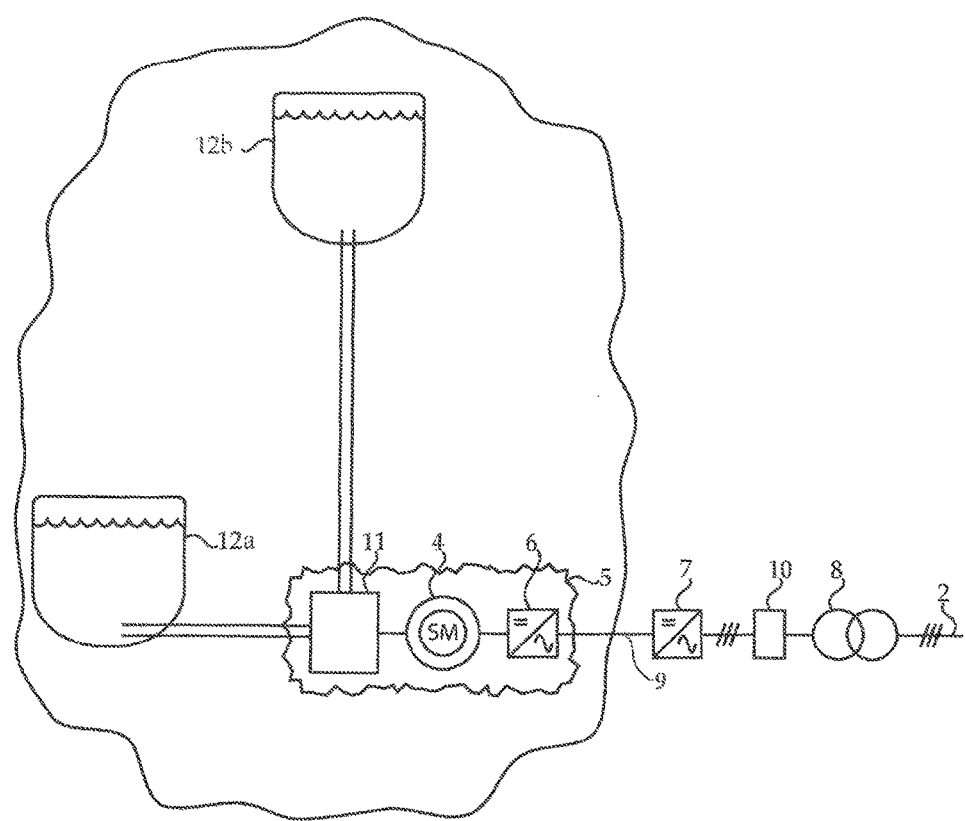
FIG. 2 shows a schematic illustration of a pumped-storage power plant.

FIG. 1 shows a schematic illustration of an electric unit 1 connected to an electric grid 2. The electric unit 1 in this case comprises a frequency converter 3 and a rotating electric synchronous machine 4. The machine 4 is in this case accommodated in a cavern 5 owing to local conditions or for protection purposes, for example.

The frequency converter 3 comprises at least two elements 6, 7 which are usable as inverter or rectifier depending on the mode of operation of the machine, for example in motor operation or generator operation. In this case, the machine-side element 6 is provided within the cavern 5 and the grid-side element 7 is provided outside the cavern 5. This is possible in particular since very modern frequency converters, such as, for example, modular multilevel converters M2LC make it possible to separate the elements 6, 7 from one another and to locate them in positions which are not in the direct vicinity of one another. Speed regulation is enabled by virtue of the fact that the machine 4 has a stator, which is fed by means of a three-phase current with adjustable frequency.

The electric machine and the machine-side element 6 or inverter unit INU of the frequency converter 3 are accommodated in the cavern 5 or, for example, a shaft. The INU acts as inverter in the pump mode and as rectifier in the turbine mode. The grid-side element 7 or active rectifier unit ARU of the frequency converter 3, which is operated as rectifier in the pump mode and as inverter in the turbine mode, is positioned outside the cavern 5 at a distance of a few tens of meters to several thousand meters from the INU. The ARU and the INU are in this case connected to one another by means of a DC link, in the form of a voltage DC link or current DC link 9.

Decoupling of the ARU and the INU is possible since temporally only slow current and voltage changes occur in the DC link 9. Therefore, there are no particularly high demands made of the line in respect to low inductance and capacitance in order to suppress resonance phenomena. The DC link 9 does, however, need to be configured in such a way that active power losses as a result of the resistance per unit length remain low. Since substantially a voltage of the same order of magnitude as at terminals of the machine 4 prevails in the DC link 9, generally high rated currents occur. This limits the length of the DC link which can be achieved economically to at most several kilometers.

The frequency conversion is produced by means of a combination of a rectifier and an inverter, which are connected to one another via a concentrated or distributed voltage DC link or current DC link. The DC link 9 and/or the elements 6, 7 of the frequency converter in this case furthermore have units for energy storage, for example capacitors in the case of a voltage DC link and inductances in the case of a current DC link.

The invention furthermore makes it possible to use a generator transformer 8 outside the cavern 5. In a system in accordance with the prior art, the generator transformer 8 is installed within the cavern 5, wherein, owing to the risk of explosion of transformer oils, complex explosion protection needs to be provided and, as a result, for example, the generator transformer 8 is installed in a secondary cavern. In accordance with the invention, the generator transformer 8 is installed outside the cavern 5. This is possible since the generator transformer 8 in the arrangement according to the invention only needs to be located close to the ARU, but not close to the machine 4. The advantages are a much smaller cavern 5, no separate or relatively large adits for introducing the generator transformer 8, and lower costs in respect of explosion protection. Furthermore, filters 10 can be used for smoothing, wherein these filters usually require a lot of space and accommodation thereof outside the cavern is therefore likewise advantageous.

In one embodiment, the frequency converter comprises a DC link 9, in particular a voltage DC link or a current DC link. The DC link 9 is provided between the elements 6, 7 and can in this case be provided in concentrated or distributed form.

The operation of the machine at a freely selectable speed has considerable advantages. In particular in the embodiment with a frequency converter and a synchronous machine, an established, reliable and low-maintenance generator technology can be used. Furthermore, there is the possibility of operating a pump 11 and a turbine 11 independently of one another in the optimum speed range of said pump 11 and turbine 11. By virtue of the use of the synchronous machine 4, high speeds can be achieved for high drops, for example, in particular even at high powers. Furthermore, the speed range which can be achieved during operation continuously ranges from zero to the maximum speed and is only restricted by the operational limits of the pump 11 and the turbine 11. The pump 11 and the turbine 11 can in principle be combined in one unit, for example a pump turbine 11. In particular, there is the possibility of retrofitting older systems for variable frequency operation without replacing the existing generator. A further advantage consists in very quick grid coupling and the possibility of generating positive and negative reactive power demanded by the grid 2 in the ARU 7 of the frequency converter 3 in order that the generator can be operated exclusively with active power, as a result of which said generator has a more compact design. Furthermore, owing to the use of the frequency converter 3, it is possible to switch over quickly from pump to turbine operation, for example.

LIST OF REFERENCE SYMBOLS

1 Electric unit
2 Electric grid
3 Frequency converter
4 Electric synchronous machine
5 Cavern
6 Machine-side electrical element
7 Grid-side electrical element
8 Generator transformer
9 DC link
10 Filters
11 Pump Turbine
12 Storage Basin

The invention claimed is:

1. A pumped-storage power plant connectable to an electric grid and comprising:
   one of (A) a water turbine and a water pump or (B) a reversible water pump turbine;
   an underground cavern located below a water storage basin;
   an electric synchronous machine located within the cavern, the synchronous machine being connected to the water turbine and the water pump or the reversible water pump turbine; and
   a frequency converter,
   wherein the frequency converter has a machine-side electrical element and a grid-side electrical element, said machine-side and said grid-side electrical elements are connected to one another, with one of the electrical elements being operable as a rectifier and another of the electrical elements being operable as an inverter, depending on an operation of the synchronous machine,
   wherein the machine-side electrical element is located with the synchronous machine within the cavern and is connected to a stator of the machine, and the grid-side electrical element is provided outside the cavern and is electrically connected to the machine-side element via a DC link, a size of the cavern thereby being minimized.

2. The pumped-storage power plant as claimed in claim 1, comprising:
   a grid transformer and/or a grid filter, which are provided outside the cavern.

3. The pumped-storage power plant as claimed in claim 1, wherein each of the electrical elements of the frequency converter are alternately operable as a rectifier and an inverter for inductive generator operation, capacitive generator operation, inductive motor operation and capacitive motor operation.

4. The pumped-storage power plant as claimed in claim 1, wherein the frequency converter is a self-commutated voltage or current source converter comprising:
   a DC link connecting the machine side electrical element and the grid side electrical element.

5. The pumped-storage power plant as claimed in claim 1, wherein the frequency converter including the machine side electrical element and the grid side electrical element is an externally commutated converter.

6. The pumped-storage power plant as claimed in claim 1, wherein an electrical connection between the electrical elements of the frequency converter has less than 0.2% active power losses.

7. The pumped-storage power plant as claimed in claim 3, comprising:
   a grid transformer and/or a grid filter, which are provided outside the cavern.

8. The pumped-storage power plant as claimed in claim 7, wherein each of the electrical elements of the frequency converter are alternately operable as a rectifier and an inverter for inductive generator operation, capacitive generator operation, inductive motor operation and capacitive motor operation.

9. The pumped-storage power plant as claimed in claim 8, wherein the frequency converter is a self-commutated voltage or current source converter comprising:
   a DC link connecting the machine side electrical element and the grid side electrical element.

10. The pumped-storage power plant as claimed in claim 8, wherein the frequency converter including the machine side electrical element and the grid side electrical element is an externally commutated converter.

11. The pumped-storage power plant as claimed in claim 10, wherein an electrical connection between the electrical elements of the frequency converter has less than 0.2% active power losses.

* * * * *